No. 722,528. PATENTED MAR. 10, 1903.
A. L. MINER & S. T. WEST.
FERTILIZER FEEDER.
APPLICATION FILED JULY 22, 1902.
NO MODEL.

WITNESSES:
William P. Goebel.
C. R. Ferguson

INVENTORS
Abraham L. Miner
Sidney T. West
BY
ATTORNEYS

UNITED STATES PATENT OFFICE.

ABRAHAM L. MINER AND SIDNEY T. WEST, OF KANKAKEE, ILLINOIS.

FERTILIZER-FEEDER.

SPECIFICATION forming part of Letters Patent No. 722,528, dated March 10, 1903.

Application filed July 22, 1902. Serial No. 116,507. (No model.)

*To all whom it may concern:*

Be it known that we, ABRAHAM L. MINER and SIDNEY T. WEST, citizens of the United States, and residents of Kankakee, in the county of Kankakee and State of Illinois, have invented a new and Improved Fertilizer-Feeder, of which the following is a full, clear, and exact description.

This invention relates to improvements in fertilizer-feeders, and particularly to that class known as "force-feeders," the object being to provide a simple, cheap, and substantial device of this character that may be placed on any planter in common use at a nominal cost, and, further, to obviate the difficulties generally experienced by those endeavoring to operate planters with fertilizer attachments.

We will describe a fertilizer-feeder embodying our invention and then point out the novel features in the appended claims.

Reference is to be had to the accompanying drawings, forming a part of this specification, in which similar characters of reference indicate corresponding parts in both the figures.

Figure 1:
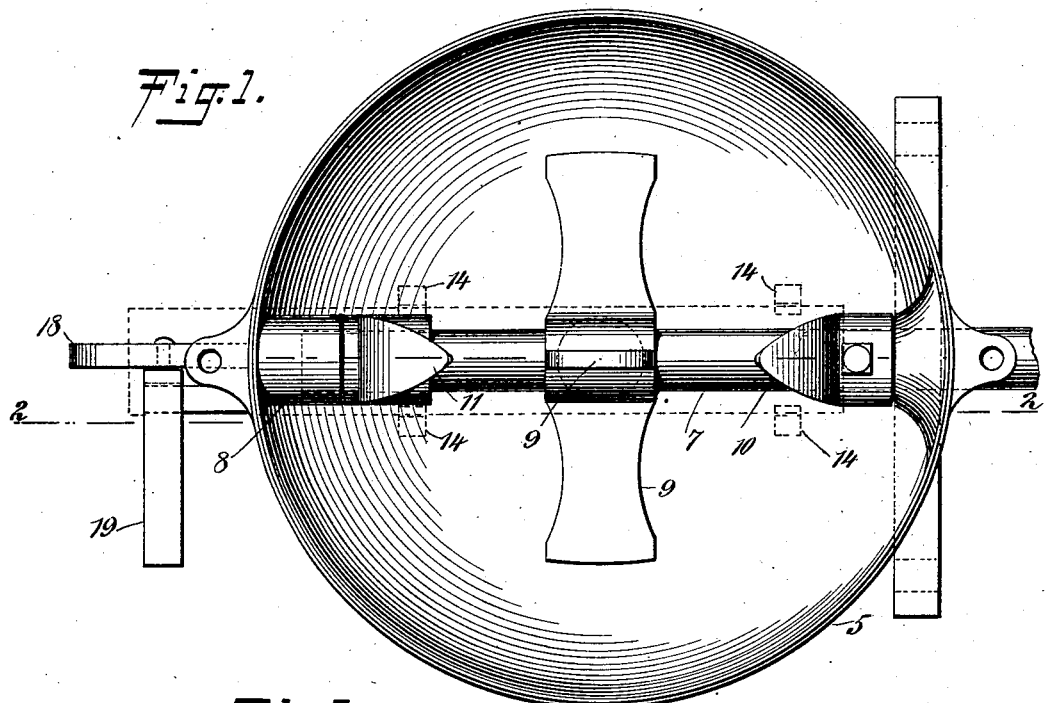
Figure 2:
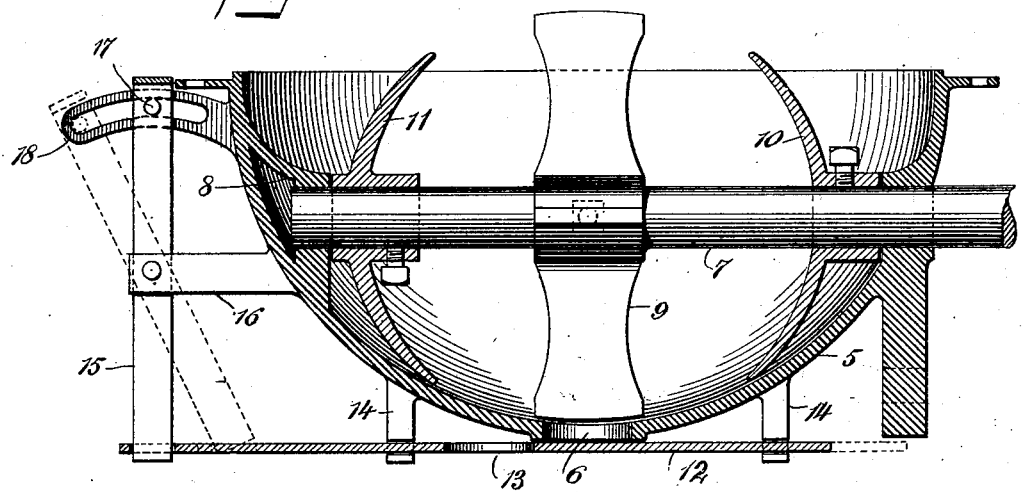

Figure 1 is a plan view of a fertilizer-feeder embodying our invention, and Fig. 2 is a section on the line 2 2 of Fig. 1.

The device comprises a receptacle 5, which is made bowl-shaped or concaved, as shown, so that fertilizer may be readily fed to the center, where the bottom is provided with an outlet 6. Extended through the receptacle is a shaft 7, designed to be rotated by connection with radial parts of a planter upon which the device is placed. This shaft extends through one side of the receptacle, and at the opposite end the shaft has a bearing in a bracket 8, which is open at the sides, so as to prevent packing of fertilizer against the same.

Attached to the center of the shaft is an agitator and feeder consisting of radial arms 9, which have a length to reach nearly to the bottom of the receptacle.

Secured to the shaft at opposite sides of the agitator and feeder 9 are the agitators and forcing devices 10 11. These forcing devices 10 11 are here shown as substantially in the form of a crescent, with the concaved side inward. By this particular construction the said devices will not only agitate or stir up the fertilizer, but will force the same toward the feeding device 9. It is to be understood, however, that we do not confine our invention to this particular form of agitators and forcing devices, the object being merely to provide devices that will cause the fertilizer to move toward the center, as before mentioned.

The opening 6 may be regulated as desired by means of a slide-plate 12, having an opening 13 corresponding in size to the opening 6. This plate 12 slides in grooves formed in hangers 14, depending from the receptacle. A shifting lever 15 is pivoted to an arm 16, extended outward from the receptacle, and has loose connection at its lower end with the plate 12, while at the upper end it is provided with a fastening-bolt 17, which passes through a slot formed in an arc-shaped arm 18, extended from the upper portion of the receptacle. The lever 15 is provided with an offset handle 19. Obviously by operating the lever 15 the plate 12 may be moved to cause the opening 13 to register more or less with the opening 6, thus regulating the discharge of fertilizer.

Having thus described our invention, we claim as new and desire to secure by Letters Patent—

1. A fertilizer-feeder comprising a receptacle having an outlet at the bottom, a shaft extended through the receptacle, radial arms attached to the shaft, and crescent-shaped agitating and forcing devices attached to the shaft at opposite sides of said radial arms, substantially as specified.

2. A fertilizer-feeder comprising a concaved receptacle having an outlet at the bottom, means for regulating said outlet, a shaft extended through the receptacle, agitating and feeding arms extended from the shaft at the center of the receptacle, and crescent-shaped agitators and forcing devices attached to the shaft at opposite sides of said arms, substantially as specified.

3. A fertilizer-feeder comprising a receptacle of concaved form having an outlet at the bottom, a regulating-plate movable along said outlet, the said plate having an opening, a shaft extended through the receptacle, arms extended radially from said shaft at the center, and crescent-shaped forcing devices attached to the shaft at opposite sides of the arms, substantially as specified.

4. A fertilizer-feeder comprising a concaved receptacle having an outlet at the bottom, hangers depending from said receptacle and having slots, a plate movable in said slots, the said plate being provided with an opening for registering more or less with the outlet of the receptacle, a lever pivoted to an arm extended from the receptacle and having a loose connection at its lower end with the slide-plate, an arc-shaped arm extended from the upper portion of the receptacle and having a slot, a fastening-bolt extended through the receptacle, feeding devices on said shaft, and forcing devices on said shaft, substantially as specified.

5. A fertilizer-feeder adapted to be attached to a planter and comprising a concaved receptacle, a shaft extended through an opening in one side of the receptacle, a bracket at the opposite side of the receptacle forming a bearing for the end of said shaft, the said bracket being open at the sides, the receptacle being provided with an outlet at the bottom, means for regulating the outlet, feeding devices on the shaft, and devices carried by the shaft for forcing material toward the feeding-arms, substantially as specified.

In testimony whereof we have signed our names to this specification in the presence of two subscribing witnesses.

ABRAHAM L. MINER.
    SIDNEY T. WEST.

Witnesses:
 WILLIAM A. WASHINGTON,
 J. F. WEST.